US009214083B2

(12) United States Patent
Lim et al.

(10) Patent No.: US 9,214,083 B2
(45) Date of Patent: Dec. 15, 2015

(54) APPARATUS AND METHOD FOR CONTROLLING AUTOMATIC OPENING OF TRUNK

(71) Applicant: Hyundai Mobis Co., Ltd., Yongin-si (KR)

(72) Inventors: Jong Chul Lim, Anyang-si (KR); Young Jun Jang, Yongin-si (KR)

(73) Assignee: Hyundai Mobis Co., Ltd., Yongin-si (KR)

( * ) Notice: Subject to any disclaimer, the term of this patent is extended or adjusted under 35 U.S.C. 154(b) by 202 days.

(21) Appl. No.: 13/864,059

(22) Filed: Apr. 16, 2013

(65) Prior Publication Data

US 2014/0022052 A1 Jan. 23, 2014

(30) Foreign Application Priority Data

Jul. 19, 2012 (KR) ........................ 10-2012-0078776

(51) Int. Cl.

| | |
|---|---|
| ***G08C 17/02*** | (2006.01) |
| ***G08C 19/12*** | (2006.01) |
| ***G05B 19/00*** | (2006.01) |
| ***B60R 25/00*** | (2013.01) |
| ***G06F 7/00*** | (2006.01) |
| ***G07C 9/00*** | (2006.01) |

(52) U.S. Cl.

CPC ............ *G08C 17/02* (2013.01); *G07C 9/00309* (2013.01); *G07C 2009/00793* (2013.01); *G07C 2209/61* (2013.01); *G07C 2209/64* (2013.01)

(58) Field of Classification Search

CPC ....................................................... G08C 17/02

USPC .......... 340/5.61, 5.2, 5.8, 5.72, 438; 341/173; 49/25, 506; 701/2, 36, 207

See application file for complete search history.

(56) References Cited

U.S. PATENT DOCUMENTS

| | | | | |
|---|---|---|---|---|
| 5,600,323 | A * | 2/1997 | Boschini | 341/173 |
| 6,236,333 | B1 * | 5/2001 | King | 340/5.61 |
| 6,476,517 | B1 * | 11/2002 | Okada | B60R 25/245 307/10.1 |
| 6,707,375 | B2 * | 3/2004 | Masudaya | 340/5.61 |
| 6,816,081 | B1 * | 11/2004 | Okada | G07C 9/00182 340/12.5 |
| 7,176,783 | B1 * | 2/2007 | Ilg | B60R 25/24 180/287 |
| 7,283,034 | B2 * | 10/2007 | Nakamura et al. | 340/5.72 |
| 7,286,042 | B2 * | 10/2007 | Perraud | B60C 23/0413 340/10.1 |
| 7,301,467 | B2 * | 11/2007 | Ishimura | B60R 25/24 340/435 |

(Continued)

FOREIGN PATENT DOCUMENTS

| | | | |
|---|---|---|---|
| CN | 101010477 | A | 8/2007 |
| EP | 1789645 | B1 | 12/2008 |

(Continued)

*Primary Examiner* — Nam V Nguyen

(74) *Attorney, Agent, or Firm* — NSIP Law

(57) ABSTRACT

Provided are an apparatus and method for controlling automatic opening of a vehicle's trunk through wireless communication between a fob key for the vehicle and a bumper LF antenna disposed in the rear of the vehicle. The apparatus controls the trunk so as to be automatically opened through communication with the bumper LF antenna on the basis of the position of the fob key and the number of receptions of an RF signal, when a fob key holder approaches the trunk for opening the trunk. Alternatively, a sensor module is attached near the trunk (particularly, a lower end center of a rear bumper) and determines whether there is the fob key, thereby allowing the trunk to be automatically opened when a sensing signal is inputted by simple movement.

10 Claims, 7 Drawing Sheets

(56) References Cited

U.S. PATENT DOCUMENTS

| | | | | |
|---|---|---|---|---|
| 7,336,151 | B2 * | 2/2008 | Ueda et al. | 340/5.72 |
| 8,044,771 | B2 * | 10/2011 | Nakajima et al. | 340/5.72 |
| 8,091,280 | B2 * | 1/2012 | Hanzel et al. | 49/25 |
| 8,155,827 | B2 * | 4/2012 | Nakajima et al. | 701/36 |
| 8,164,416 | B2 * | 4/2012 | Lee et al. | 340/5.6 |
| 8,228,166 | B2 * | 7/2012 | Eberhard | 340/5.72 |
| 8,284,020 | B2 * | 10/2012 | Ghabra et al. | 340/5.61 |
| 8,335,598 | B2 * | 12/2012 | Dickerhoof | 340/438 |
| 8,428,792 | B2 * | 4/2013 | Nakashima | B60R 25/24 180/287 |
| 8,531,268 | B2 * | 9/2013 | Ghabra | B60R 25/24 340/10.33 |
| 2001/0028296 | A1 | 10/2001 | Masudaya | |
| 2006/0273888 | A1 * | 12/2006 | Yamamoto | B60R 25/33 340/426.36 |
| 2009/0115639 | A1 * | 5/2009 | Proefke et al. | 340/989 |
| 2009/0284345 | A1 * | 11/2009 | Ghabra | B60R 25/24 340/5.61 |

FOREIGN PATENT DOCUMENTS

| | | | |
|---|---|---|---|
| EP | 2098670 | A1 | 9/2009 |
| EP | 2098671 | A1 | 9/2009 |
| EP | 2098672 | A1 | 9/2009 |
| KR | 10-2010-0022755 | A | 3/2010 |
| KR | 10-2012-0062115 | A | 6/2012 |

* cited by examiner

APPARATUS AND METHOD FOR CONTROLLING AUTOMATIC OPENING OF TRUNK

CROSS-REFERENCE TO RELATED APPLICATIONS

This application claims priority under 35 U.S.C. §119 to Korean Patent Application No. 10-2012-0078776, filed on Jul. 19, 2012, the disclosure of which is incorporated herein by reference in its entirety.

TECHNICAL FIELD

The present disclosure relates to an apparatus and method for controlling an operation of a vehicle in wireless communication with the vehicle, and in particular, to an apparatus and method for controlling automatic opening of a vehicle's trunk through wireless communication between a fob key and the vehicle.

BACKGROUND

Fob keys of vehicles are apparatuses that control an operation of a vehicle in wireless communication with a low frequency (LF) antenna of the vehicle, and control the unlocking and locking of a vehicle's door and an opening operation of the vehicle's trunk, thereby providing the convenience of a user. In a current smart key system, a vehicle control method using a fob key determines whether the fob key is inside or outside a vehicle with the electric field strength of each of the fob key and antennas, receives a signal from the fob key, and enables an operation of the vehicle.

In the related art, when a user desires to open a vehicle's trunk with a fob key, the user transmits a trunk opening command signal to an radio frequency (RF) antenna by personally manipulating the fob key, and thus opens the trunk.

However, a user generally opens a trunk for taking a thing out of the trunk or putting a thing into the trunk. Considering this, the automatic opening of a trunk is necessary for a user that is having a heavy load or a bulky load with its hands.

In a related art trunk opening method using a fob key, a user that is having a load with its hands needs to approach a trunk, put down the load, and manipulate a fob key to open the trunk. That is, a user opens a trunk through two-time operation, and is required to personally manipulate a fob key. For this reason, the related art trunk opening method cannot have the advantage of wireless communication.

SUMMARY

Accordingly, the present disclosure provides an apparatus and a method that check the position of a fob key through wireless communication between a bumper LF antenna and fob key of a vehicle and, when movement is sensed by a sensor attached near a bumper, automatically open a trunk.

The present disclosure also provides a method that senses movement with a sensor and automatically opens a trunk, when the transmission of an LF signal is stopped for reducing consumption of a dark current.

The present disclosure also provides a method that opens a trunk only when a driver approaches a trunk nearby.

In one general aspect, an apparatus for controlling automatic opening of a trunk includes: a sensor module attached near a trunk of a vehicle, and sensing movement; a bumper LF antenna disposed in a rear of the vehicle, and transmitting an LF signal at certain intervals; an RF antenna receiving an RF signal that a fob key for the vehicle transmits in response to reception of the LF signal; and a controller determining whether the fob key is within a predetermined distance from the LF antenna on the basis of the RF signal and, when the fob key is within the predetermined distance and the sensor module senses movement, outputting an opening command for the trunk.

The controller may output the opening command for the trunk of the vehicle when the fob key is within the predetermined distance from the LF antenna, number of times the RF antenna receives the RF signal for a predetermined time is more than or equal to number of predetermined times, and the sensor module senses movement. Also, while the bumper LF antenna does not transmit the LF signal at certain intervals, when the sensor module senses movement, the controller may output a transmission command for the LF signal.

In another general aspect, a method of controlling automatic opening of a trunk includes: commanding a bumper LF antenna of a vehicle to transmit an LF signal; receiving an RF signal that a fob key of the vehicle receiving the LF signal transmits in response to reception of the LF signal; determining whether a distance between the fob key and the bumper RF antenna is within a predetermined distance; operating a sensor when the fob key is within the predetermined distance, the sensor being attached near the trunk of the vehicle; and outputting an opening command for the trunk of the vehicle when the sensor senses movement of an object.

In another general aspect, a method of controlling automatic opening of a trunk includes: sensing, by a sensor attached near a trunk of a vehicle, movement when a bumper LF antenna stops transmission of an LF signal for reducing consumption of a dark current; commanding the bumper LF antenna of the vehicle to transmit the LF signal when the sensor senses the movement; receiving an RF signal that the fob key transmits in response to the LF signal; and outputting an opening command for the trunk of the vehicle when number of receptions of the RF signal is more than or equal to number of predetermined times for a predetermined time, thereby enabling the automatic opening of the trunk.

The outputting of an opening command may include: determining a distance between the bumper LF antenna and the fob key, on the basis of information included in the RF signal; and outputting an opening command for the trunk of the vehicle when a distance to the fob key is within a predetermined distance, thereby enabling the automatic opening of the trunk only when a fob key holder continuously approaches the trunk.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

Figure 1:
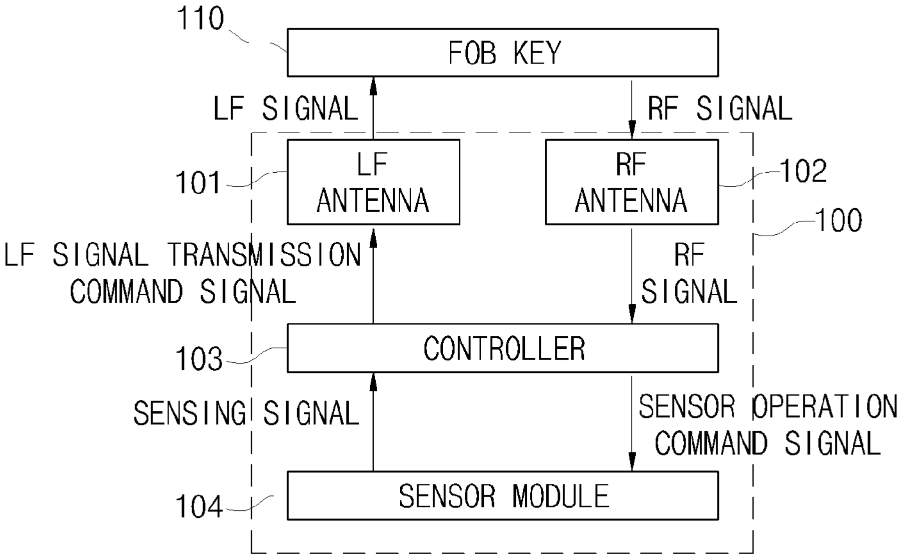
FIG. 1 is a block diagram illustrating a structure of an apparatus for controlling automatic opening of a trunk according to an embodiment of the present invention.

FIG. 1 is a block diagram illustrating a structure of an apparatus for controlling automatic opening of a trunk according to an embodiment of the present invention.

Referring to FIG. 1, an apparatus 100 for controlling automatic opening of a trunk includes an LF antenna 101, an RF antenna 102, a controller 103, and a sensor module 104.

Figure 5:
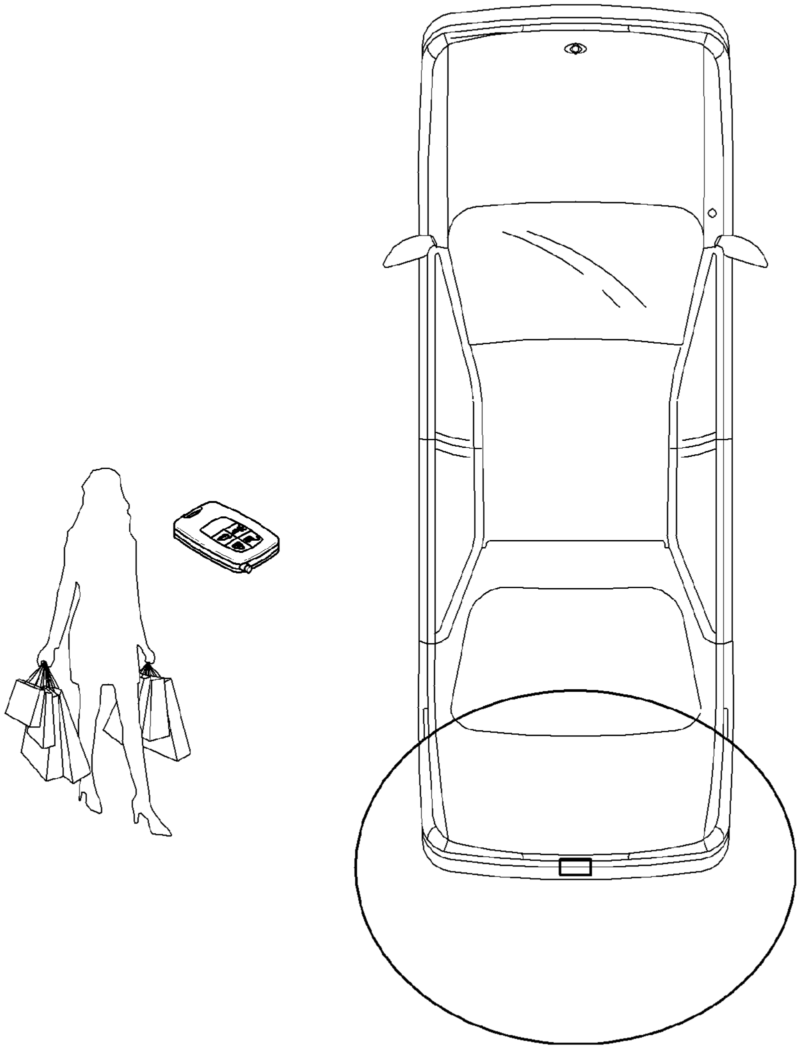
FIG. 5 is a diagram illustrating a position and sensing area of a bumper LF antenna of a vehicle.

The LF antenna 101 may be provided in plurality, in a vehicle. However, the present invention relates to an apparatus and a method that automatically open a trunk when a user intending to open the trunk approaches the trunk, and thus, in the present invention, an LF antenna communicating with a fob key 110 denotes a bumper LF antenna disposed in the rear of a vehicle. FIG. 5 illustrates a position and sensing area of a bumper LF antenna of a vehicle. When the fob key 110 is disposed in the sensing area, a vehicle is controlled through wireless communication between an antenna and the fob key 110.

Figure 6:
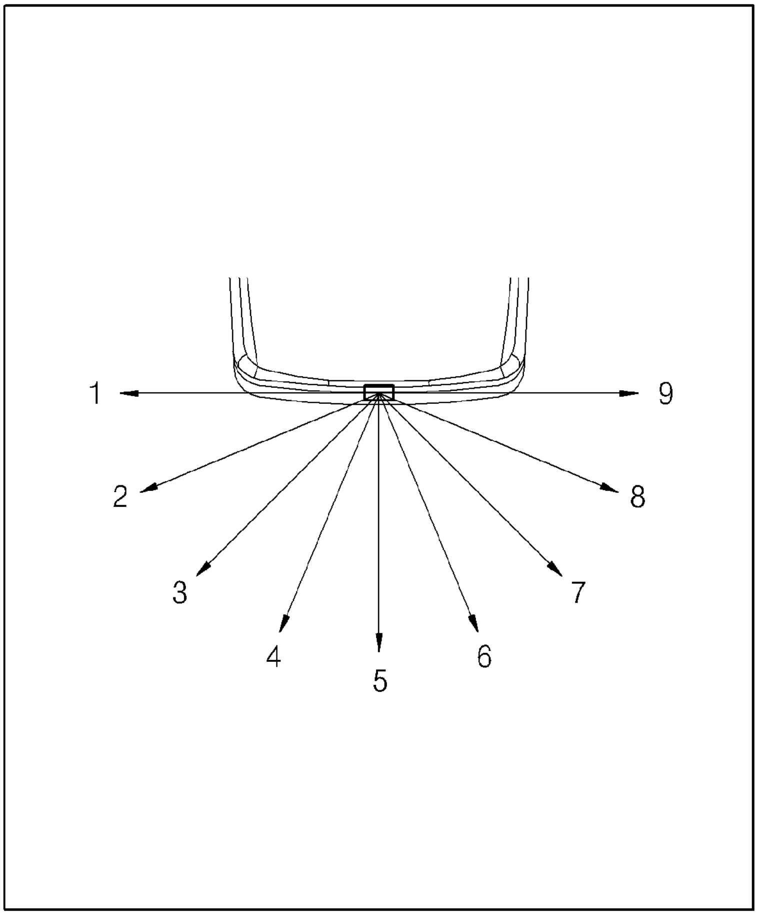
FIG. 6 is a diagram illustrating a direction in which a bumper LF antenna of a vehicle is capable of sensing.

The LF antenna 101 has the high degree of accuracy. Therefore, the LF antenna 101 may be disposed at various heights (for example, 60, 90, and 120 cm), and may sense a fob key that approaches in various directions (for example, nine directions illustrated in FIG. 6).

The LF antenna 101 transmits an LF signal at certain intervals. A current system varies an LF signal transmission period with time, for minimizing consumption of a dark current. For example, the LF antenna 101 transmits the LF signal at a ratio of once/200 ms for initial four days from a time at which a vehicle stalls and receives a door lock signal from the fob key 110, and transmits the LF signal at a ratio of once/800 ms until before ten days elapse from after the initial four days. Subsequently, when ten days elapse, the LF antenna 101 stops transmission of the LF signal.

Except that a vehicle stalls for preventing consumption of a dark current, the LF antenna 101 continuously transmits the LF signal at certain intervals, and thus enables the check of whether a fob key for a vehicle is disposed near the LF antenna 101.

The RF antenna 102 receives an RF signal transmitted from the fob key 110 that has received the LF signal transmitted from the LF antenna 101. The fob key 110 calculates a distance between the LF antenna 101 and the fob key 110, on the basis of the intensity (electric field strength) of the received LF signal. Furthermore, the fob key 110 transmits an RF signal with distance information added thereinto, and the RF antenna 102 receives the RF signal transmitted from the fob key 110 to transfer the RF signal to the controller 103.

The RF antenna 102 may be disposed inside the controller 103, in which case an RF signal transferred from the RF antenna 102 to the controller 103 includes current distance information between the LF antenna 101 and the fob key 110.

Figure 7:
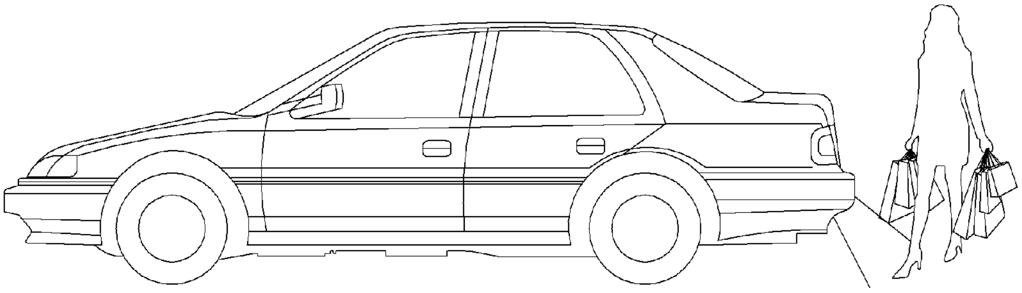
FIG. 7 is a diagram illustrating movement that a fob key holder makes for opening a trunk, according to an embodiment of the present invention.

The sensor module 104 is attached near a vehicle's trunk, and senses movement. The sensor module 104 may be provided as one or more. As illustrated in FIG. 7, the sensor module 104 may be disposed under the rear bumper of a vehicle so as to sense the foot movement of a user intending to open a trunk, or may be disposed at a position corresponding to a knee height of an ordinary person.

A plurality of sensors may be arranged in the lower end center (for example, a width corresponding to one-third to one-fifth of a bumper length) of a rear bumper of a vehicle, for providing a user's convenience, saving the cost, and preventing inaccurate detection.

Moreover, by arranging a plurality of sensors in one row, the sensors may detect directionality from respective sensing signals, and the sensor module 104 may transfer a movement sensing signal only when movement is made in a certain direction. For example, by arranging two sensors under a rear bumper of a vehicle vertically to the rear bumper, the sensor module 104 may generate and transfer a movement sensing signal only when movement is sensed in a direction from the rear of the vehicle to the front of the vehicle. Accordingly, the present invention can prevent the unnecessary automatic opening of a trunk that is caused when the movement of an animal passing under a bumper is sensed.

The sensor module 104 may always maintain an operable state, and perform sensing irrespective of whether an RF signal is received. Alternatively, the sensor module 104 may normally maintain a non-operation state, and when the RF signal is received, the sensor module 104 may operate and sense movement near a sensor.

When the sensor module 104 senses movement near a sensor, the sensor module 104 transfers a sensing signal to the controller 103.

The controller 103 receives an RF signal through the RF antenna 102 and receives a sensing signal from the sensor module 104 to output a trunk opening command.

The controller 103 compares a predetermined distance and distance information to the fob key 110 on the basis of the received RF signal, and when it is determined that the fob key 110 is disposed within the predetermined distance, the controller 103 may output the trunk opening command. In this case, the predetermined distance may be changed and set with a head unit of a vehicle.

The controller 103 may measure the number of times the RF signal is received for a predetermined time, on the basis of information of the received RF signal, and only when the number of receptions of the RF signal is more than or equal to the number of predetermined times, the controller 103 may output the trunk opening command.

In a state where the sensor module 104 does not operate, when an RF signal is received, the controller 103 outputs an operation command for the sensor module 104. While the LF antenna 101 does not transmit an LF signal, when a sensing signal is received from the sensor module 104, the sensor module 104 outputs an LF signal transmission command for the LF antenna 101.

Figure 2:
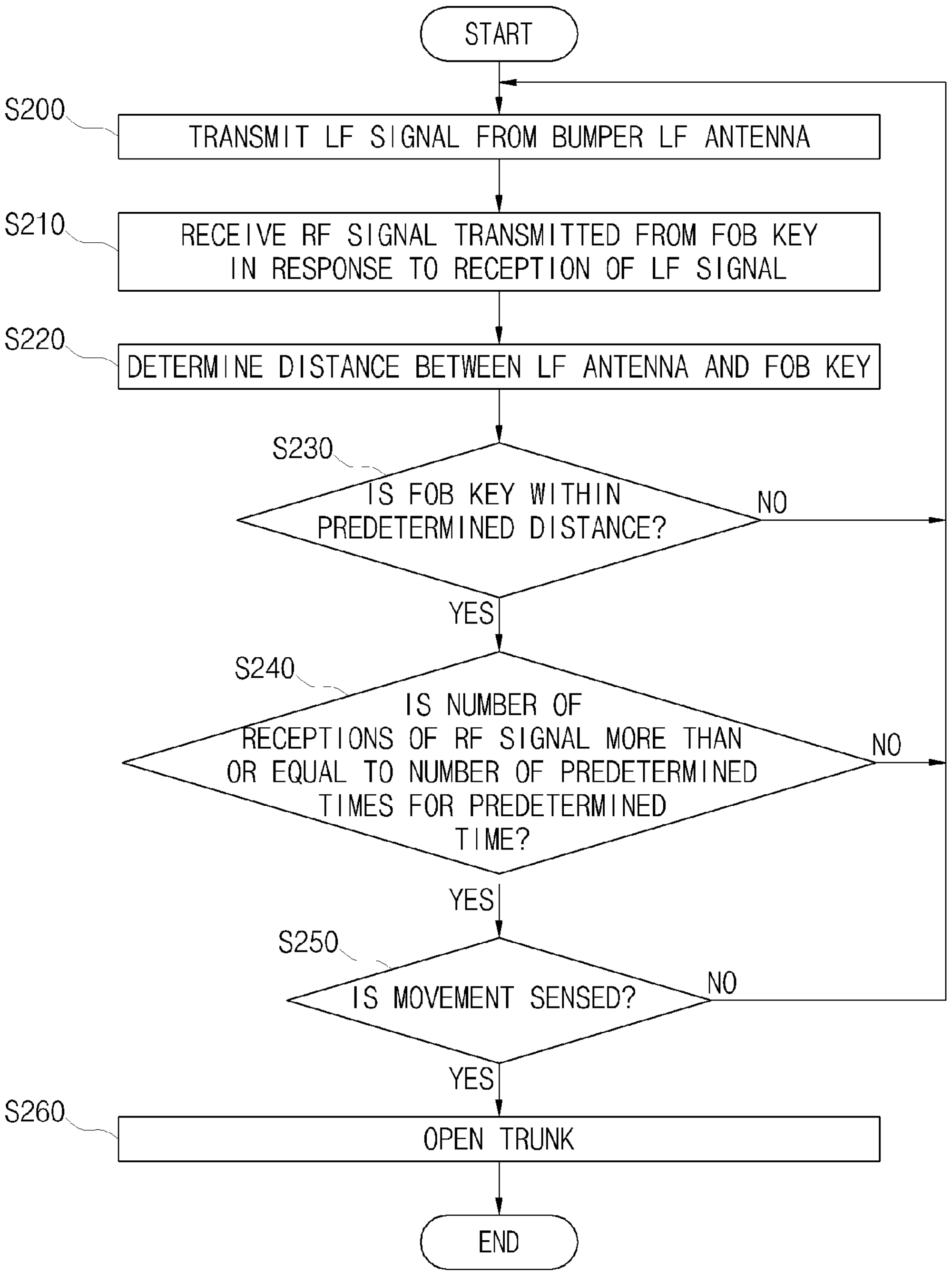
FIG. 2 is a flowchart illustrating a method of controlling automatic opening of a trunk according to an embodiment of the present invention.

FIG. 2 is a flowchart illustrating a method of controlling automatic opening of a trunk according to an embodiment of the present invention.

In operation S200, a bumper LF antenna disposed in the rear of a vehicle transmits an LF signal periodically, for sensing a fob key near the vehicle. When the fob key for the vehicle is within an area that enables reception of an LF signal from the LF antenna, the fob key transmits an RF signal in response to reception of the LF signal, and an RF antenna of the vehicle receives the RF signal, in operation S210.

In transmitting the RF signal, the fob key calculates a distance between the LF antenna and the fob key with the intensity of the received LF signal, and adds the calculated distance information into the RF signal to transmit the RF signal including the distance information. Therefore, the controller 103 receives the RF signal to determine the distance between the LF antenna and the fob key, in operation S220.

Accordingly, when it is determined that the fob key is within the predetermined distance from the bumper LF antenna of the vehicle in operation S230, and the number of times the RF signal is received for a predetermined time is more than or equal to the number of predetermined times in operation S240, the controller 103 determines that a fob key holder approaches near the trunk of the vehicle or is located near the trunk.

At this point, when a sensor module disposed near the rear bumper or trunk of the vehicle senses movement that is made by the body action of the fob key holder in operation S250, the controller 103 outputs a trunk opening command and thus allows the trunk to be opened in operation S260.

In this case, the controller 103 may allow the trunk to be opened under only conditions in which the fob key is disposed within a certain area and the sensor module senses movement.

Figure 3:
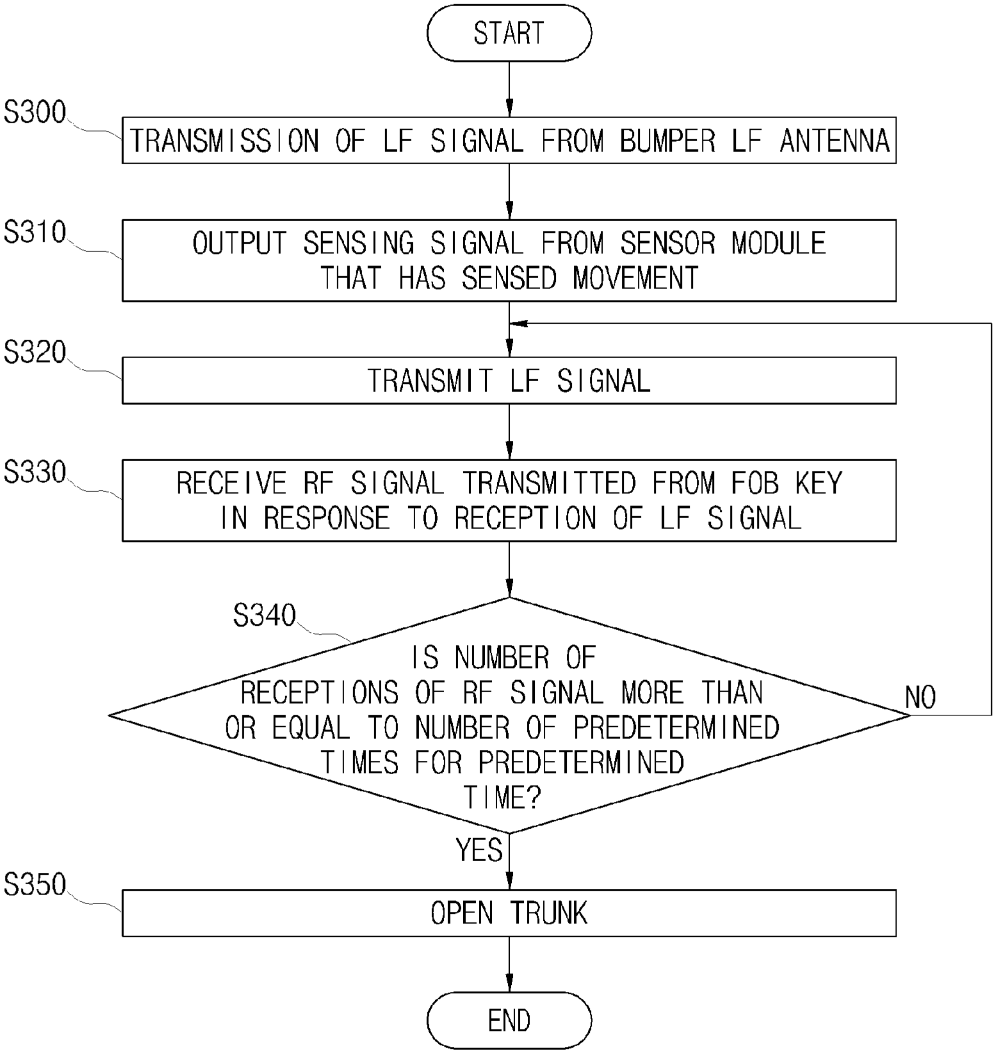
FIG. 3 is a flowchart illustrating a method of controlling automatic opening of a trunk when the transmission of an LF signal is stopped, according to an embodiment of the present invention.

FIG. 3 is a flowchart illustrating a method of controlling automatic opening of a trunk when the transmission of an LF signal is stopped, according to an embodiment of the present invention.

An LF antenna of a vehicle extends an LF signal transmission period when a certain duration (for example, five days) elapses from a time at which the vehicle stalls for reducing consumption of a dark current and a door lock signal is received from a fob key, and then, when a certain duration further elapses, the LF antenna stops transmission of an LF signal itself.

For this reason, while transmission of the LF signal is stopped, wireless communication is not performed for checking the position of a fob key, and thus, another method (differing from the method that has been described above with reference to FIG. 2) of controlling automatic opening of a trunk is required.

While a bumper LF antenna stops transmission of the LF signal in operation S300, even though a fob key holder approaches a trunk, the LF signal and an RF signal are not transmitted/received.

The fob key holder makes movement (for example, foot movement) in order for a sensor module to sense the movement, for opening the trunk. Therefore, when the sensor module senses the movement, the sensor module outputs a sensing signal in operation S310. When the controller 103 receives the sensing signal, the controller 103 allows the LF antenna to transmit the LF signal, in operation S320. The fob key holder is generally located near the trunk when the LF signal is transmitted, and thus, the fob key (receiving the LF signal) near the trunk transmits the RF signal in response to the LF signal, whereupon an RF antenna of the vehicle receives the RF signal, in operation S330.

In this case, since the movement has been already sensed by the sensor module, when the RF signal is received from the fob key for the vehicle, the controller 103 controls the trunk so as to be automatically opened. Also, the controller 103 determines whether the number of times the RF signal is received for a predetermined time is more than or equal to the number of predetermined times in operation S340, and only when the number of receptions of the RF signal is more than or equal to the number of predetermined times, the controller 103 allows the trunk to be opened in operation S350.

Figure 4:
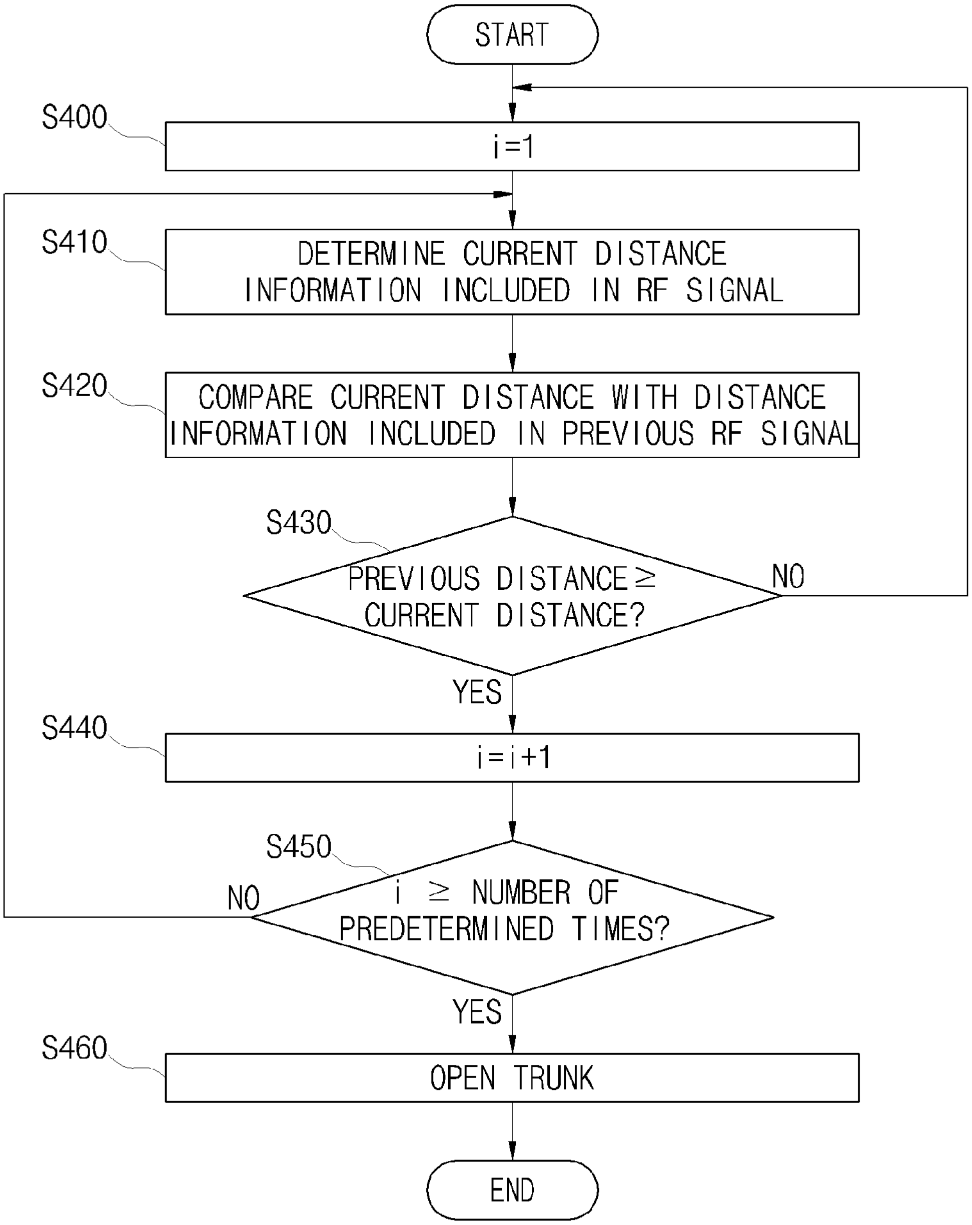
FIG. 4 is a flowchart illustrating a method of controlling automatic opening of a trunk only when a fob key holder approaches the trunk nearby, according to an embodiment of the present invention.

FIG. 4 is a flowchart illustrating a method of controlling automatic opening of a trunk only when a fob key holder approaches the trunk nearby, according to an embodiment of the present invention.

The present invention sets a trunk opening reference such as the position of a fob key or whether the number of times an RF signal is received for a certain time is more than or equal to the number of predetermined times, for preventing a trunk from being unnecessarily opened when a fob key holder passes near the trunk without intending to open the trunk. The method of FIG. 4, which has been advanced compared to the trunk opening reference, relates to a method that continuously checks a distance between a fob key and an antenna and, only when a fob key holder approaches a trunk nearby, controls the opening of the trunk.

In order to count the number of times a distance between an antenna and a fob key is reduced, the method sets "i" to 1, in operation S400. The method receives an RF signal, and checks distance information included in the RF signal, in operation S410. Furthermore, the method compares the received distance information and distance information included in a previous RF signal in operation S420, and determines whether a current distance between the fob key and the antenna is shorter than or equal to the distance included in the previous RF signal in operation S430.

When the current distance is not greater than the previous distance, this denotes that the position of the fob key progressively approaches a trunk, and thus, the method increases "i" by 1, in operation S440. When "i" is more than or equal to the number of predetermined times (for example, five times) in operation S450, the method allows the trunk to be automatically opened in operation S460.

When "i" is less than the number of predetermined times, the method repeatedly performs an operation that compares distance information included in a subsequently received RF signal, and only when the number of times a distance between the fob key and the antenna is reduced is more than or equal to the number of predetermined times continuously, the method allows the trunk to be opened. Accordingly, when a fob key holder having no intention to open the trunk passes for driving the vehicle in a direction from the rear of the vehicle to a driver's seat, the method can prevent the trunk from being opened due to wireless communication with the fob key.

In the above-described method of controlling automatic opening of a trunk, when a trunk is opened due to a satisfied condition, the bumper LF antenna stops transmission of an LF signal, and the sensor module attached near a trunk stops an operation.

As described above, the present invention provides the apparatus and method that automatically open a trunk according to a driver approaching the trunk or a simple foot movement, without manipulating a fob key.

Moreover, the present invention allows the trunk opening apparatus to operate only when a fob key is in a certain region from a trunk, and thus prevents the trunk from being opened due to a fob key holder which passes near a vehicle without intending to open the trunk. Also, by using both wireless communication and sensing as simultaneous conditions for opening a trunk, the present invention minimizes the unnecessary opening of the trunk.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for controlling automatic opening of a trunk, comprising:

a sensor module attached near a trunk of a vehicle, and sensing movement;

a bumper LF antenna disposed in a rear of the vehicle, and transmitting an LF signal at certain intervals;

an RF antenna receiving an RF signal that a fob key for the vehicle transmits in response to reception of the LF signal; and a controller outputting an opening command for the trunk based on the controller determining that the fob key is within a predetermined distance from the LF antenna on the basis of the RF signal, a number of receptions by the RF antenna of the RF signal for a predetermined time being more than or equal to a predetermined number of receptions of the RF signal within the predetermined distance for the predetermined time, and the sensor module sensing movement of a holder of the fob key.

2. The apparatus of claim 1, wherein the controller outputs a transmission command for the LF signal in response to the sensor module sensing movement.

3. The apparatus of claim 1, wherein the sensor module operates in response to the RF antenna receiving the RF signal from the fob key.

4. The apparatus of claim 1, wherein the sensor module is disposed in at least one of a lower end portion of a rear bumper of the vehicle or a knob portion of the trunk of the vehicle.

5. A method of controlling automatic opening of a trunk, the method comprising:

commanding a bumper LF antenna of a vehicle to transmit an LF signal;

receiving an RF signal that a fob key of the vehicle receiving the LF signal transmits in response to reception of the LF signal;

determining that a distance between the fob key and the bumper RF antenna is within a predetermined distance;

determining that a number of receptions of the RF signal from the fob key within a predetermined time is more than or equal to a predetermined number of receptions of the RF signal within the predetermined distance;

operating a sensor in response to the determination that the fob key is within the predetermined distance and the determination that the number of receptions of the RF signal for the predetermined time is more than or equal to the predetermined number of receptions of the RF signal for the predetermined time, the sensor being attached near the trunk of the vehicle; and outputting an opening command for the trunk of the vehicle in response to the sensor sensing movement of a holder of the fob key.

6. The method of claim 5, wherein the determining of whether a distance between the fob key and the bumper RF antenna is within a predetermined distance comprises:

calculating, by the fob key, a distance between the bumper LF antenna and the fob key on the basis of intensity of the received LF signal;

transmitting, by the fob key, an RF signal comprising distance information based on the calculated distance; and determining whether the fob key is within the predetermined distance, on the basis of the distance information.

7. The method of claim 5, further comprising changing and setting at least one of the predetermined distance, the predetermined time, or the number of predetermined times.

8. A method of controlling automatic opening of a trunk, the method comprising:

sensing, by a sensor attached near a trunk of a vehicle, movement;

commanding a bumper LF antenna of the vehicle to transmit an LF signal in response to the sensing of the movement;

receiving an RF signal that a fob key transmits in response to the LF signal; and outputting an opening command for the trunk of the vehicle in response to a number of receptions of the RF signal, in which each reception comprises distance information between the bumper LF antenna and the fob key, being more than or equal to a predetermined number of receptions of the RF signal for predetermined time and in response to a determination that the received distance information of the RF signal is within a predetermined distance for a predetermined time.

9. The method of claim 8, further comprising:

comparing a first distance and a second distance, the first distance being determined with the RF signal, and the second distance being determined with a previous RF signal;

wherein the outputting of the opening command for the trunk is in response to the number of receptions of the RF signal being continuously more than or equal to the a predetermined number of receptions of the RF signal comprising a reduction in distance for the predetermined time such that the first distance is shorter than the second distance.

10. The method of claim 8, further comprising stopping, by the bumper LF antenna, transmission of the LF signal, and stopping operation of the sensor attached near the trunk, in response to the outputting of the opening command for the trunk of the vehicle.

* * * * *